Sept. 19, 1950  M. CASERTA  2,522,991
RETAINER SPRING CLIP
Filed Sept. 24, 1945
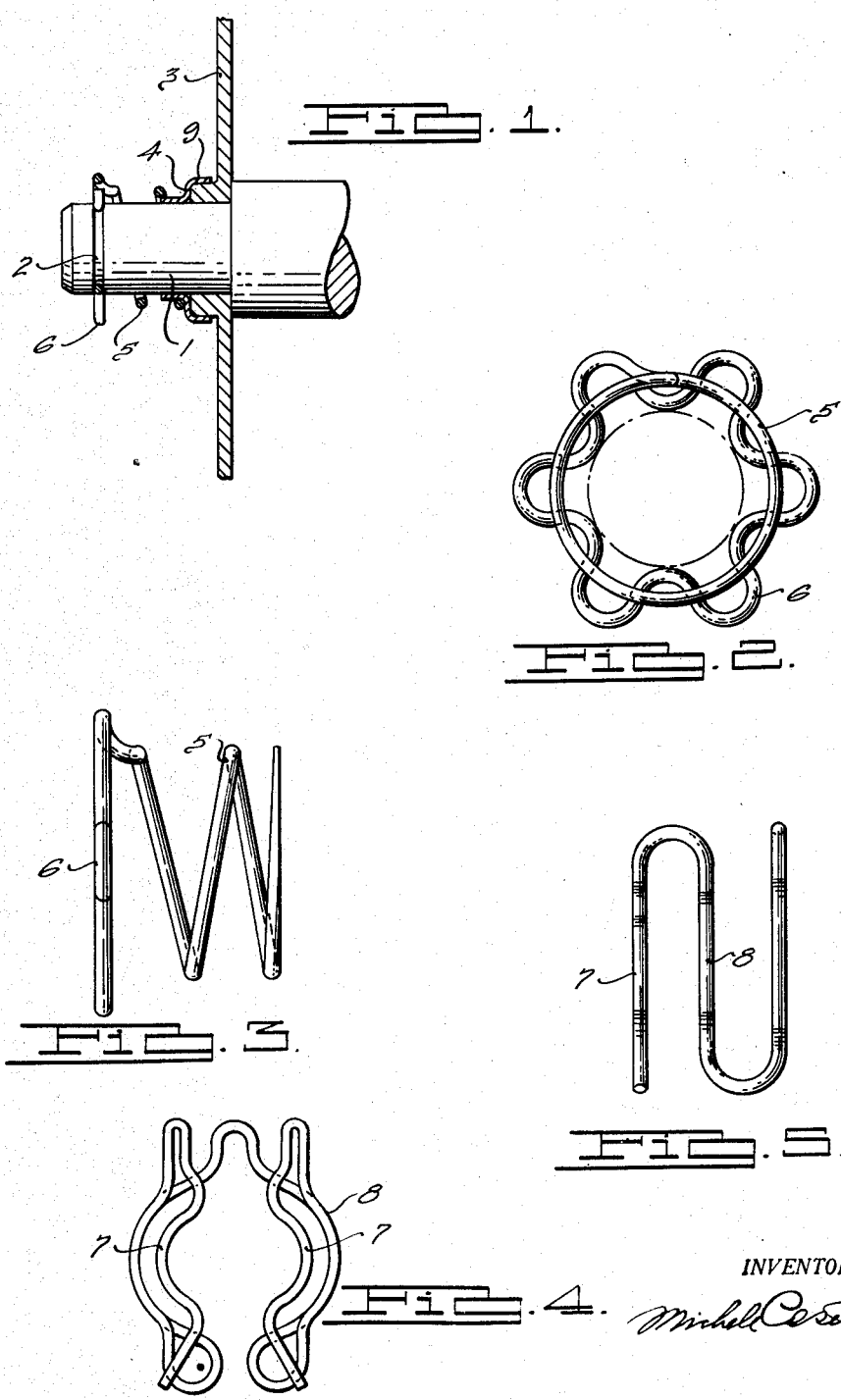
INVENTOR:
Michell Caserta Patented Sept. 19, 1950

2,522,991

UNITED STATES PATENT OFFICE 2,522,991

RETAINER SPRING CLIP

Michele Caserta, Lake Orion, Mich.

Application September 24, 1945, Serial No. 618,191

7 Claims. (Cl. 287—53)

This invention relates generally to spring clips. More particularly, it relates to a simple type of spring fastener primarily intended for use in maintaining parts in assembled relation.

It is an object of the invention to provide a simple, easily manufactured, and effective retainer spring construction primarily intended for retaining a rod or pin in assembled relation with a part having an aperture through which the rod or pin projects.

In many cases, the spring retainer device of the present invention may be substituted for the conventional cotter pins used in many instances for maintaining parts in assembled relation.

As will be readily appreciated, the device of the present invention is not only much simpler and easier to apply than a cotter pin type of fastener, but has other and further marked distinctions and advantages.

Still another object of the invention is to provide a fastening device of this general character in which the fastener not only serves the purpose of holding parts in assembled relation, but serves to apply spring pressure to the assembled parts in order to eliminate looseness or rattle.

Many other objects, advantages, and features of the present invention will become more clearly apparent from the following description, the drawings relating thereto, and from the claims hereinafter set forth.

In the drawings:

Figure 1 illustrates the manner in which one form of the improved spring fastener may be utilized for maintaining parts in assembled relation.

Figure 2 is an enlarged, top plan view of a spring clip construction of the type utilized for assembling the parts shown in Figure 1.

Figure 3 is a side elevational view of the spring clip structure shown in Figure 2.

Figure 4 is a top plan view of a modified form of spring clip structure similar in purpose and function to the construction shown in Figures 1 to 3, inclusive.

Figure 5 is a side elevational view of the spring clip construction shown in Figure 4.

With more particular reference to the drawings, it will be readily appreciated that while the spring clip structure shown may have many and various uses, it is primarily intended to maintain a rod or pin in predetermined assembled relation with respect to any associated structure having an aperture therein through which the rod or pin passes.

Generally speaking, spring clip constructions of the general type with which the present invention is concerned have two main functions. One portion of the spring clip is designed and intended to firmly engage the rod or pin and the remainder of the clip constitutes a compression spring adapted to bear against the plate or panel portion with which the rod is to be assembled.

In the structure shown in Figure 1, it will be readily seen that the construction shown includes a pin or rod 1 which has an annular recess 2 formed therein adjacent the end thereof. This pin or rod is adapted to be assembled in predetermined position with respect to a panel or wall structure 3 which in the specific form shown includes a shoulder or abutment 4 against which the improved spring clip of the present invention is adapted to bear.

In the specific form of the invention shown in Figures 1 to 3, it will be readily seen that the spring clip itself is formed of a single integral length of wire, one end of which is preformed to provide a helical compression coil spring portion 5 which is directly connected to a head portion 6 comprising an annular series of scallops or undulations, all lying in substantially the same plane. The spring is formed so that the interior diameter of this head portion is slightly less than the minimum diameter of the recess in which this head portion is adapted to seat. The resilience of the convolutions of the head portions of the spring clip make it possible to snap this fastener onto the end of the rod so that the head portion will seat in the annular recess 2, firmly connecting the spring clip to the pin. A cap or washer 9, as shown in Figure 1, may be indicated, particularly if the panel or wall structure 3 is made of relatively soft material, but is not absolutely necessary.

The radial depth, the number and shape of the convolutions can be so proportioned with reference to the diameter of the wire as to obtain the desired radial flexibility. It is then possible to use a rather stiff coil spring made of comparatively large diameter wire, the coils of which are radially very stiff, and still the end coil, because of the convolution, can be made resilient enough to go over a shoulder in the rod and fall into the groove with the desired tension.

In this construction also, it will be readily seen that the radial resiliency of the head portion 6 can be proportioned as desired with reference to the stiffness of the springs 5 in the direction of the axis of the rod, simply by varying the shape or length of the undulations that constitute the head portions.

The helical compression spring portion of the clip is preferably formed of a length sufficient so that when the head portion of the clip is seated in the groove, the opposite end of the spring will bear against the part with which the pin is assembled and maintain the helical portion of the spring under compression.

For precision constructions, the end of the coil spring structure may be ground to provide a plane surface perpendicular to the axis of the spring in order to provide a substantial area of engagement for the end of the spring against the panel structure with which the clip is assembled.

In the modified form of the invention shown in Figures 4 and 5, it will be readily appreciated that the spring clip structure shown therein is designed and intended for the same purpose and function as the spring clip structure shown in Figures 1 to 3, inclusive. In this embodiment of the invention, however, the two ends of the single piece of wire from which the clip is formed constitute the head portion 7 of the clip and are adapted to snap into a recess similar to the recess 2 when the parts are assembled. The midportion of the single piece of wire from which the clip shown in Figures 4 and 5 is formed is bent upon itself to provide a pair of undulating coil springs 8 which may have any number of convolutions desired, depending upon the length of the compression spring which is to be utilized for the particular assembled construction. These two undulating coil springs 8 which are, as shown, formed from a single piece of wire are spaced from each other sufficiently far so that they will more or less surround the pin to which the head portion is fastened.

It will be readily appreciated that the principal distinction between the form of spring clip construction shown in Figures 4 and 5 over that shown in Figures 1 to 3, inclusive, resides in the fact that in the construction of Figs. 4 and 5, the spring clip may be applied to the pin laterally and, likewise, may be used in connection with a rod or pin of indefinite length and in which access to the end of the rod is not necessary for installing the clip construction.

It will be appreciated that the two specific forms of the invention illustrated in the drawings and described in detail above are merely illustrative of many forms which the improved spring clip construction may take. Many other modifications thereof may be made falling within the scope of the invention as set forth in the following claims.

What is claimed is:

1. A spring retainer construction for fastening a rod having an annular recess therearound to a member having an aperture therein through which said rod projects, said retainer comprising a single length of wire preformed to provide a resilient head portion adapted to snap into engagement with the annular recess in said rod, said wire being further preformed to provide a compression coil spring extending from said head portion and abutting against said member.

2. A spring retainer construction for fastening a rod having an annular recess therearound to a member having an aperture therein through which said rod projects, said retainer comprising a single length of wire preformed to provide a resilient head portion adapted to snap into engagement with the annular recess in said rod, said wire being further preformed to provide a compression coil spring extending from said head portion and abutting against said member, said compression coil spring at least partially surrounding said rod.

3. A spring retainer construction for fastening a rod having an annular recess therearound to a member having an aperture therein through which said rod projects, said retainer comprising a single length of wire preformed to provide a resilient head portion adapted to snap into engagement with the annular recess in said rod, said wire being further preformed to provide a compression coil spring extending from said head portion and abutting against said member, said compression coil spring being of generally helical form and surrounding said rod.

4. A spring retainer construction for fastening a rod having an annular recess therearound near one end thereof to a member having an aperture therein through which the end of said rod is adapted to project, said retainer comprising a single length of wire having one end preformed to provide a head portion adapted for snap fastening engagement with the annular recess in said rod, the opposite end of said length of wire being preformed to provide a compression spring adapted to abut against said member, said compression coil spring being helical in form and being adapted to surround said rod in spaced relation with respect thereto.

5. A spring retainer construction for fastening a rod having an annular recess therearound near one end thereof to a member having an aperture therein through which the end of said rod is adapted to project, said retainer comprising a single length of wire having one end preformed to provide an annular series of undulations lying in a common plane whereby to provide a head portion having an inner diameter normally smaller than the diameter of said annular recess in said rod, the opposite end of said length of wire being preformed to provide a generally helical coil spring extending in a direction generally perpendicular to the plane of said head portion.

6. A spring retainer construction for fastening a rod having an annular recess therearound near one end thereof to a member having an aperture therein through which said rod is adapted to project, said retainer comprising a single length of wire having the end portions thereof preformed to provide a head portion for said retainer adapted for snap fastening engagement with the recess in said rod, the mid-portion of said length of wire being preformed to provide a pair of sinuous spring elements extending in a direction generally perpendicular to the plane of said head portion.

7. In a combination, a rod-like member provided with a transverse recess, and a spring clip construction comprising a single integral length of wire preformed to provide a spring portion tensionable substantially in the direction of the axis of said rod-like member, and a head portion provided with undulations in a plane substantially normal to said axis and engaging said transverse recess.

MICHELE CASERTA.

REFERENCES CITED

The following references are of record in the file of this patent:

UNITED STATES PATENTS

| Number | Name | Date |
|---|---|---|
| 1,994,617 | Meehan | Mar. 19, 1935 |